United States Patent [19]
Davidson et al.

[11] Patent Number: 5,639,163
[45] Date of Patent: Jun. 17, 1997

[54] ON-CHIP TEMPERATURE SENSING SYSTEM

[75] Inventors: Evan Ezra Davidson, Hopewell Junction; Francis Edward Bosco, Poughkeepsie; Charles Kyriakos Vakirtzis, New Windsor, all of N.Y.

[73] Assignee: International Business Machines Corporation, Armonk, N.Y.

[21] Appl. No.: 339,056

[22] Filed: Nov. 14, 1994

[51] Int. Cl.$^6$ ............................................... G01K 7/01
[52] U.S. Cl. ........................ 374/178; 327/512; 374/172
[58] Field of Search ................................ 374/172, 175, 374/178; 327/512; 257/467

[56] References Cited

U.S. PATENT DOCUMENTS

| | | |
|---|---|---|
| 4,071,813 | 1/1978 | Dobkin ............................ 374/178 |
| 4,243,898 | 1/1981 | Seelbach . |
| 4,448,549 | 5/1984 | Hashimoto et al. ................. 374/178 |
| 4,625,128 | 11/1986 | Boeckmann ...................... 374/178 |
| 4,760,434 | 7/1988 | Tsuzuki et al. . |
| 4,768,170 | 8/1988 | Hoff . |
| 4,791,380 | 12/1988 | Chiappetta . |
| 4,875,131 | 10/1989 | Leipold et al. ..................... 374/178 |
| 4,952,865 | 8/1990 | Pataut et al. . |
| 5,024,535 | 6/1991 | Winston ........................... 374/178 |
| 5,039,878 | 8/1991 | Armstrong et al. ................ 327/512 |
| 5,094,546 | 3/1992 | Tsuji ................................ 374/178 |
| 5,154,514 | 10/1992 | Gambino et al. .................. 374/178 |
| 5,206,778 | 4/1993 | Flynn et al. . |
| 5,213,416 | 5/1993 | Neely et al. ...................... 374/178 |
| 5,237,481 | 8/1993 | Soo et al. ......................... 257/467 |

FOREIGN PATENT DOCUMENTS

| | | | |
|---|---|---|---|
| 0012373 | 2/1978 | Japan ................................ 374/178 |
| 0143183 | 11/1979 | Japan ................................ 374/178 |
| 0019825 | 2/1984 | Japan ................................ 374/178 |
| 0830148 | 5/1981 | U.S.S.R. ............................ 374/178 |
| 2034111 | 5/1980 | United Kingdom ................ 374/178 |
| 2222884 | 3/1990 | United Kingdom ................ 374/178 |

OTHER PUBLICATIONS

IBM Technical Disclosure Bulletin, vol. 28, No. 1, Jun. 1985, Kara et al. "Chip Temperature Measurement," pp. 404–406.

IBM Technical Disclosure Bulletin, vol. 36, No. 08, Aug. 1993, Aubertine et al., "On Chip Temperature Sensor," pp. 489–491.

DeKold, D., "Diode pair senses differential temperature," Electronics, vol. 47, No. 15, pp. 97–98 (25 Jul. 1974).

Primary Examiner—Diego F. F. Gutierrez
Attorney, Agent, or Firm—Lynn L. Augspurger; Laurence J. Marhoefer

[57] ABSTRACT

A pair of on-chip thermal sensing diodes are formed together and interconnected with a common cathode to form a differential sensing pair. A pair of precision resistors external to the chip generates two constant currents, one for each diode, with a ratio of one to the other on the order of 100 to 1. The precision resistor values are selected so that variations about the nominal values of metal and via resistances between the diode contacts and the chip contact pads (e.g. C4 contacts) are negligible compared to the precision resistor values. Leads, connected respectively to two pads on the chip, couple a differential output of the anode voltages of the diode pair to the input of a high impedance amplifier.

3 Claims, 2 Drawing Sheets

ON-CHIP TEMPERATURE SENSING SYSTEM

BACKGROUND OF THE INVENTION

1. Field of the Invention

This invention relates to an on-chip temperature sensing system, and more particularly, to an improved system, which does not require calibration to account for variations in circuit parameters and connection parameters which inevitably result in the manufacturing process.

2. Description of the Prior Art

There have been a number of prior art proposals for on-chip temperature sensing. These proposals include the use of a pair of on-chip thermally responsive diodes coupled to an off-chip current source. The diode pair generates differential voltage output proportional to temperature. This proposal, and an alternative proposal, that theoretically does not require calibration are shown in IBM Technical Disclosure Bulletin Vol. 28, No. 1, June 1985. Despite the theory, in practice, the output of these prior art circuits, as a function of temperature, varies from one manufactured on-chip circuit to another to an extent that calibration particular to each on-chip circuit is required for satisfactory operation.

The need for calibration of prior art on-chip temperature sensors is a cost factor. Also, calibration of each circuit makes it impractical to implement on-chip temperature sensing in certain applications where it would be desirable. For example, proposals have been made in the prior art to sense the temperature of all the chips in a multi-chip module. The ability to monitor the temperature of all the chips in a multi-chip module has advantages over monitoring the temperature of only sample chips in both module design and manufacturing. Measuring chip temperature on a sample basis results in incomplete and potentially misleading data. Chips not included in the sample can overheat, resulting in component damage which is not detected until significant numbers of failures have been reported. Full sampling enables detection of overheated chips and timely modifications to bring the chips back within a specified operating range. See IBM Technical Disclosure Bulletin Vol. 36, No. 08, August 1993.

The prior art proposed use of an on-chip thermal sensing diode in which the junction voltage varies with operating temperature is a potentially low cost technology for monitoring chip temperature. However, prior art circuits using on-chip thermal sensing diodes have required each circuit to be individually calibrated after it has been manufactured, which adds appreciably to the cost and has made full chip monitoring of multi-chip modules very expensive.

SUMMARY OF THE INVENTION

An object of this invention is the provision of an on-chip thermal sensing diode circuit that does not require individual calibration.

Additional objects include a circuit that provides accurate on-chip temperature sensing. One that is compatible with CMOS processes and is insensitive to process and power supply variations.

A further object of the invention is the provision of a circuit that is immune to high frequency noise on the output transmission line.

Briefly, this invention contemplates the provision of a pair of on-chip thermal sensing diodes formed together and interconnected with a common cathode to form a differential sensing pair. A pair of precision resistors, external to the chip, generates two currents, one for each diode, with a ratio of one to the other on the order of 100 to 1. The precision resistor values are large so that variations about the nominal values of metal and via resistances between the diode contacts and the chip contact pads (e.g. C4 contacts) are negligible compared to the precision resistor values. Leads, connected respectively to two pads on the chip, couple a differential output of the anode voltages of the diode pair to the input of a high impedance amplifier, whose output voltage is a function of chip temperature.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
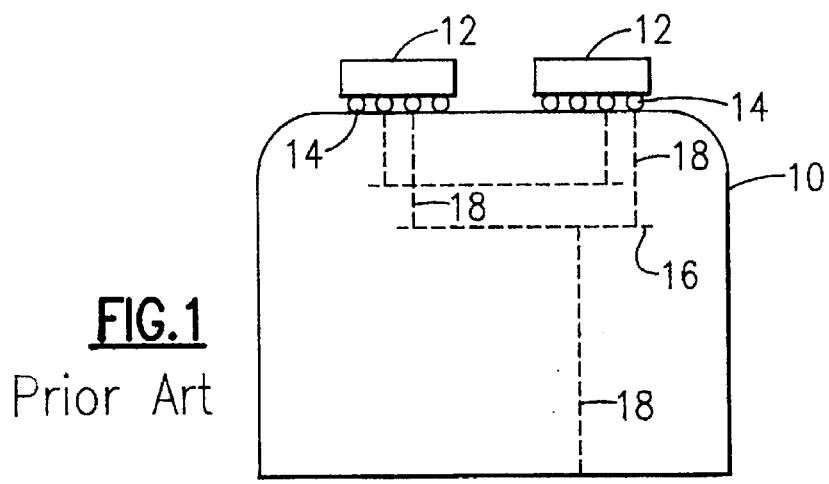
FIG. 1 is a schematic drawing of a multi-chip module representative of modules well known and widely used in the computer art.

Referring first, by way of background, to FIG. 1, a multi-chip module MCM 10, of a type well know and widely used in the computer industry, has a large number of integrated circuit chips 12 mounted on its upper surface. The chips 12 are mechanically and electrically connected to the module by suitable pads 14 such as so-called C4 pads. Power and signal connections to the chips 12 are made by means of printed wiring layers 16 shown in this FIG. 1 disposed horizontally, and vias 18 which provide connections between layers and connections to the C4 pads 14. Here it will be appreciated that power connections to and signal connections from a thermal sensor in a chip 12 that is part of a multi-chip module 10 are made through the printed wiring layers 16 and the vias 18.

Figure 2:
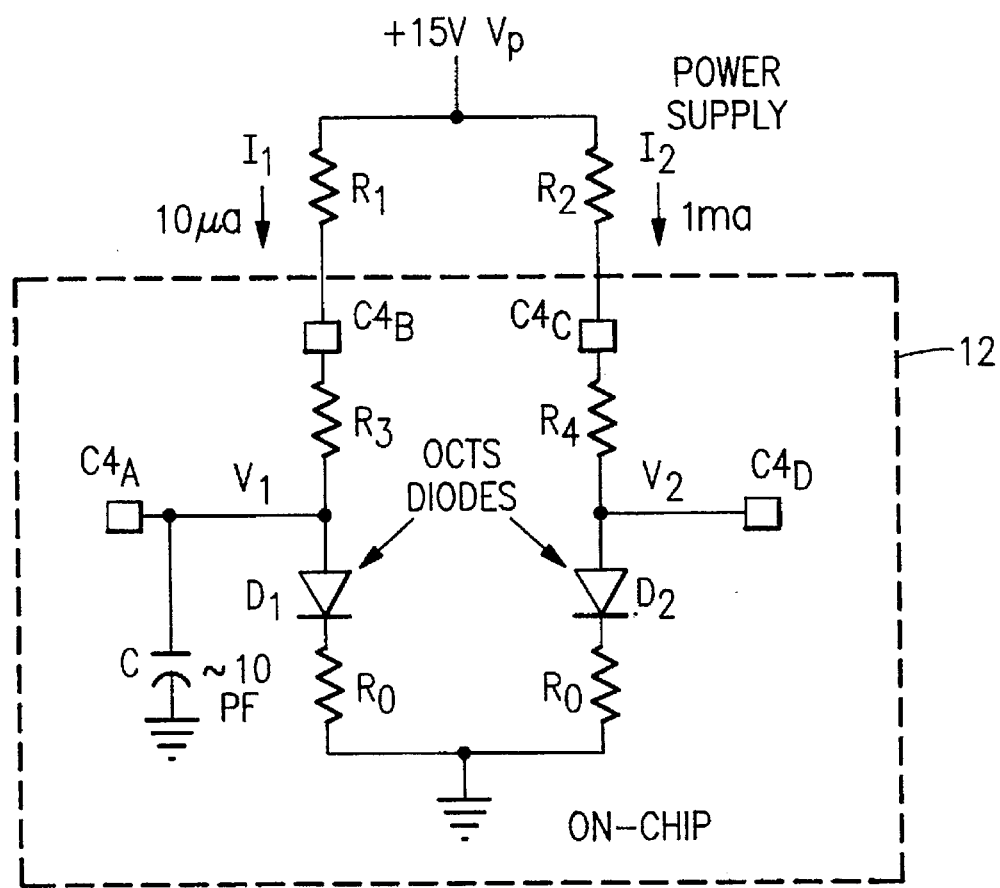
FIG. 2 is a schematic drawing of an on-chip thermal sensor circuit in accordance with the teachings of this invention.

Referring now to FIG. 2, an on-chip thermal sensing circuit, in accordance with the teachings of this invention, has a pair of thermal sensing diodes $D_1$ and $D_2$ that are formed adjacent to one another as part of a chip 12 whose temperature is to be measured. The diodes $D_1$ and $D_2$ are interconnected with a common cathode to form a differential sensing pair with $V_1$–$V_2$ as an output voltage signal. Pads $C4_A$ and $C4_D$, respectively connect the anode voltages $V_1$ and $V_2$ of $D_1$ and $D_2$ to the input of a high impedance amplifier 32 (shown in FIG. 3). A power supply $V_p$, external to the chip 12, and precision resistors $R_1$ and $R_2$, also external to the chip 12, provide two current sources $I_1$ and $I_2$, respectively, forward biasing the diodes $D_1$ and $D_2$. Pads $C4_B$ and $C4_D$ on the chip 12 connect the external precision resistors $R_1$ and $R_1$ respectively to the anodes of diodes $D_1$ and $D_2$. As will be appreciated from the explanation set forth in connection with FIG. 1, the connection from the external resistors $R_1$ and $R_2$ to the pads $C4_B$ and $C4_C$ is made through wiring planes and vias in the module to which the chip 12 is attached. The resistance of these paths are represented schematically in FIG. 2 as resistors $R_3$ and $R_4$. Here it should be noted that connections to pads $C4_A$ and $C4_D$ are made through wiring plane and via paths in the module. But the resistance of these paths is not represented in the diagram of FIG. 2 because the input current to the high impedance differential amplifier through these paths is so small that the effect of the resistance of these paths on the operation of the circuit is negligible.

The precision external resistors $R_1$ and $R_2$ are precision resistors with a tolerance such that the ratio (r) of $R_2$ to $R_1$ ($R_2/R_1$) is on the order of $R_2/R_1 = r \pm 1\%$. $R_1$ and $R_2$ are selected to establish the ratio of current in $D_1$ to the current in $D_2$ at a value on the order of 100 to 1 while at the same time keeping both diodes in their normal operating range and without large resistive voltage drops or high carrier injection in the diodes. In a typical example for a CMOS chip, $R_1$ is selected to provide a 10 ua current and $R_2$ is selected to provide a 1 ma current. Ro is the diode bulk resistance and is small in terms of absolute value and the value can be held within a tight tolerance. For these reasons the diode bulk resistance is not a parameter whose effect on the circuit output will cause appreciable change in output as a function of temperature.

A capacitor C is connected to the $C4_A$ pad to prevent high frequency near-end noise on the differential transmission line that connects the diodes to the differential amplifier from being magnified and reflected back to the amplifier. The capacitor C is important to the overall successful operation of the circuit because the diode $D_1$ with its low bias current presents a high transmission line impedance. The capacitor C may be formed in the chip 12 from driver output devices or other suitable techniques such as a gate oxide capacitor.

The differential output ($V_2-V_1$) of the circuit shown in FIG. 2 as a function of temperature is:

$$V_2 - V_1 = \frac{kT}{q} \ln\frac{I_2}{I_1} + R_0(I_2 - I_1)$$

where:

k is Boltzman's constant
q is the electronic charge constant
T is temperature in °K.
Currents and $R_0$ are shown in FIG. 2.

Here it should be noted, having selected the external precision resistors $R_1$ and $R_2$ to keep the diode currents within their normal operating range, the diode saturation current does not appear in the equation. The constants and currents that do appear in the equation are well defined, and since the $D_1$ diode current $I_1$ is only 1% of the $D_2$ diode current $I_2$, the $I_1$ current can be ignored in the term $R_0(I_2-I_1)$. The differential output voltage of the circuit is a linear function of temperature, which simplifies the voltage to temperature conversion algorithm.

Figure 3:
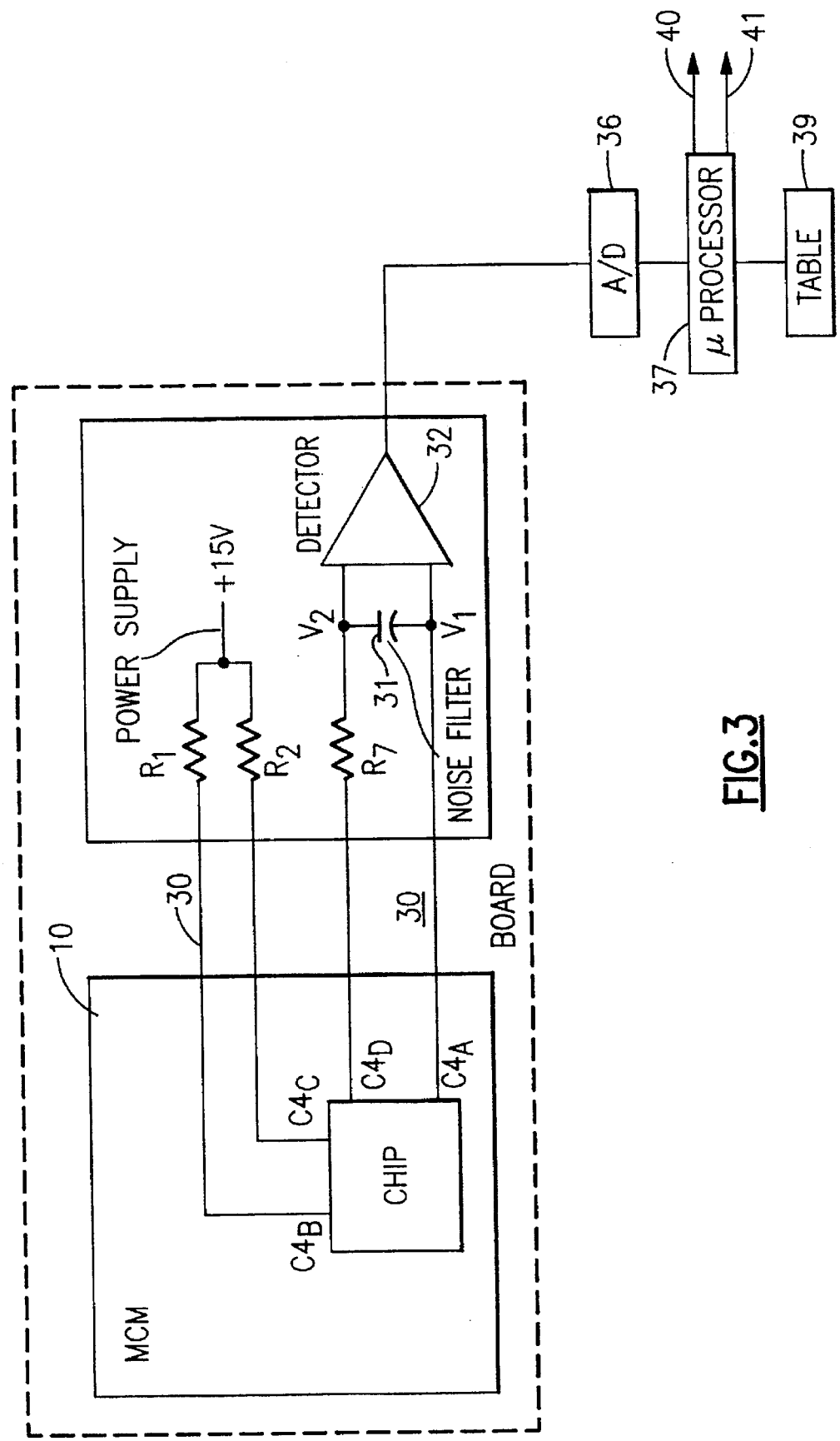
FIG. 3 is a schematic diagram of a thermal protection system in accordance with the teachings of this invention and employing the on-chip thermal sensor circuit of FIG. 1.

Referring now to FIG. 3, it depicts the overall system of this invention. Module wiring planes 16, module vias 18 (shown only in FIG. 1) and leads 30 and resistor $R_7$ connect the pads $C4_A$ and $C4_D$ to the input of a high impedance differential amplifier 32 via a high frequency input filter 31. Similarly, the pads $C4_B$ and $C4_C$ are connected to external precision resistors $R_1$ and $R_2$ which in turn are connected to the positive terminal of suitable supply voltage, e.g. a 15 volt supply. The output of the amplifier 32, which is a function of the differential input voltage, is coupled as an input to an analogue to digital convertor 36 whose output is coupled as an input to a microprocessor 37. Also connected to the microprocessor is a look-up table 39 for converting digital values of the differential voltage ($V_2-V_1$) to temperature values in degrees C.° or F.°, as desired. The microprocessor outputs these temperature values over a suitable bus 41, which is particularly useful in development and manufacturing. The processor can also compare the measured value to limit and provide an over temperature output signal on lead 40 in response to an over temperature condition. For example, when the module cooling system is impaired and the chip temperature rises to a value between 85° C. and 100° C., the differential voltage "$V_2-V_1$" at the input to the detector is sufficient to cause a protective reaction. The latter can be a power supply shut-down or in the case of CMOS circuits, the cessation of the system clock as a means of reducing the chip power to reduce the chip's operating temperature. Any repair action required can then be scheduled. In the meantime, no damage or diminution of the chips' long term reliability will occur.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An on-chip temperature sensing system comprising in combination;

a first and a second thermal sensing diodes formed on a semiconductor chip whose temperature is to be monitored, said first and second thermal sensing diodes interconnect with a common cathode to form a differential sensing pair;

a power supply disposed apart from said semiconductor chip;

a first precision resistor disposed apart from said semiconductor chip, said first precision resistor coupling said power supply to said first thermal sensing diode to provide a first current of a predetermined magnitude to said first thermal sensing diode, said first current maintaining said first thermal sensing diode in its normal operating range;

a second precision resistor disposed apart from said semiconductor chip, said second precision resistor coupling said power supply to said second thermal sensing diode, to provide a second current of a predetermined magnitude to said second thermal sensing diode, said second current maintaining said first thermal sensing diode in its normal operating range; and said first current of a predetermined magnitude being on the order of one hundred times as large as said second current of a predetermined magnitude; and means to couple the anode of said first thermal sensing diode and means to couple the anode of said second thermal sensing diode as differential inputs to a high impedance amplifier.

2. The on-chip temperature sensing system as in claim 1, wherein said means to couple the anode of said second thermal sensing diode includes a high frequency filter formed on said chip.

3. The on-chip temperature sensing system as in claim 2, wherein said high frequency filter is a capacitor.

* * * * *